United States Patent [19]

Geshwind

[11] Patent Number: 5,050,984

[45] Date of Patent: Sep. 24, 1991

[54] METHOD FOR COLORIZING FOOTAGE

[76] Inventor: David M. Geshwind, 184-14 Midland Pky., Jamaica, N.Y. 11432

[21] Appl. No.: 6,291

[22] Filed: Jan. 20, 1987

Related U.S. Application Data

[63] Continuation of Ser. No. 601,091, Apr. 20, 1984, which is a continuation-in-part of Ser. No. 492,816, May 9, 1983.

[51] Int. Cl.$^5$ ............................................. G03B 19/18
[52] U.S. Cl. ........................................ 352/38; 355/40; 352/129; 358/16; 358/80; 358/81
[58] Field of Search ............... 358/80, 81, 16; 355/40; 352/129, 38

[56] References Cited

U.S. PATENT DOCUMENTS

| | | | |
|---|---|---|---|
| 2,854,504 | 9/1958 | Lawrence | 358/16 |
| 3,231,667 | 1/1966 | Bingley | 358/16 |
| 3,294,898 | 12/1966 | Gold | 358/16 |
| 3,772,465 | 11/1973 | Vlahos et al. | 355/40 |
| 3,784,736 | 1/1974 | Novak | 358/81 |
| 4,149,185 | 4/1979 | Weinger | 358/80 |
| 4,334,240 | 6/1982 | Franklin | 358/80 |

OTHER PUBLICATIONS

"The Development and Application of Colorization" by Wilson Markle JSMPTE Jul., 1984, pp. 632-635.
SMPTE Journal, Jul., '84, pp. 632-635.

*Primary Examiner*—Monroe H. Hayes

[57] ABSTRACT

A system is disclosed in which individual black & white frames from film (100) are colorized by combination with color film (120) generated by computer (110) assisted techniques. Color information is processed, for example, by filtering, cross-dissolving or interpolation. The technique is also applicable to modifying the color of black & white portions of full color film (340) to repair damaged or degraded frames or to create special effects.

53 Claims, 5 Drawing Sheets

METHOD FOR COLORIZING FOOTAGE

CROSS-REFERENCE TO RELATED APPLICATION

This application is a continuation of application Ser. No. 601,091, filed Apr. 20, 1984, which was a continuation-in-part of application Ser. No. 492,816, filed May 9, 1983.

TECHNICAL FIELD

The invention relates to a method for adding color to existing black & white motion picture footage through a combination of human determinations, computer assisted generation, interpolative processes and time domain processing.

BACKGROUND ART

Presently a great deal of footage from old black & white movies is available. However, much of this footage is relatively unmarketable because of the starkness and plainess of black & white images as compared to color images. This is particularly true in view of the fact that color has permeated not only the motion picture field but also the secondary market of television where old black & white firm simply does not have the appeal of a competing color telecast.

In an attempt to solve some of these problems, numerous techniques have evolved. For example, the movie may be reprinted on color film with a sepia color, or other attractive color. The color for various scenes may even be varied depending upon the contents of scenes, the lighting level and the like. Thus blue might be used for a night scene, sepia for an indoor scene and green in a park like setting.

In an attempt to get a mixture of coloration on black & white television shows, products have even been marketed which comprise a thin transparent plastic film which is adhered to a television screen and which contain several stripes of color, for example, a blue region at the top presumably coloring the sky, a green region on the bottom, corresponding to foliage, and a brown region in the center corresponding to the various characters in the scene. However none of the above systems are capable of individually providing the various elements in the picture with realistic colors.

The alternative to this type of colorization is individual coloring of each frame of the movie. Naturally, this is a manual operation and, involves the colorization of a great number of frames and accordingly a relatively great expense.

DISCLOSURE OF INVENTION

In accordance with the present invention the colorization of existing black & white footage is achieved by individually, for a first frame, outlining the regions to be colorized in various colors, storing this information in a random access memory and using a computer to "fill in" the various colors inside the various regions in the scene in accordance with the stored information. The color information contained in the first colored frame is then used on all successive frames until half way to the next frame to be individually colored is reached after which the color information from that second colored frame is used. Alternatively, a mixture of information may be used. Because the color information for each Nth frame is inaccurate for the frames which lie between every Nth frame, the reduction of psysiologically perceptible inaccuracies in colorization is achieved by decreasing the resolution of the color information (i.e. the number of color information pixels), effectively blurring its outlines. Likewise, only color information is stored during this process, thus having the advantage of decreasing the number of bits per second processed by the computer.

Because of the response of the eye, the combination of low resolution color plus high resolution black & white images gives the impression of a high resolution color image. Moreover, not only is the eye insensative to the fact that the color information used is not strictly accurate, but the resulting color picture looks more realistic than individually colored frames which tend to get a "cartoonlike" appearance. In accordance with a further embodiment of the inventive method, the value of N may be increased greatly by interpolating the outlines for color information to obtain color information for a number of individual frames which lie between the first and the Nth frame and define equal time periods between the first and the Nth frame.

BRIEF DESCRIPTION OF DRAWINGS

One way of carrying out the invention is described below with reference to the drawings which illustrate only several embodiments in which.

BEST MODE FOR CARRYING OUT THE INVENTION

Figure 1:
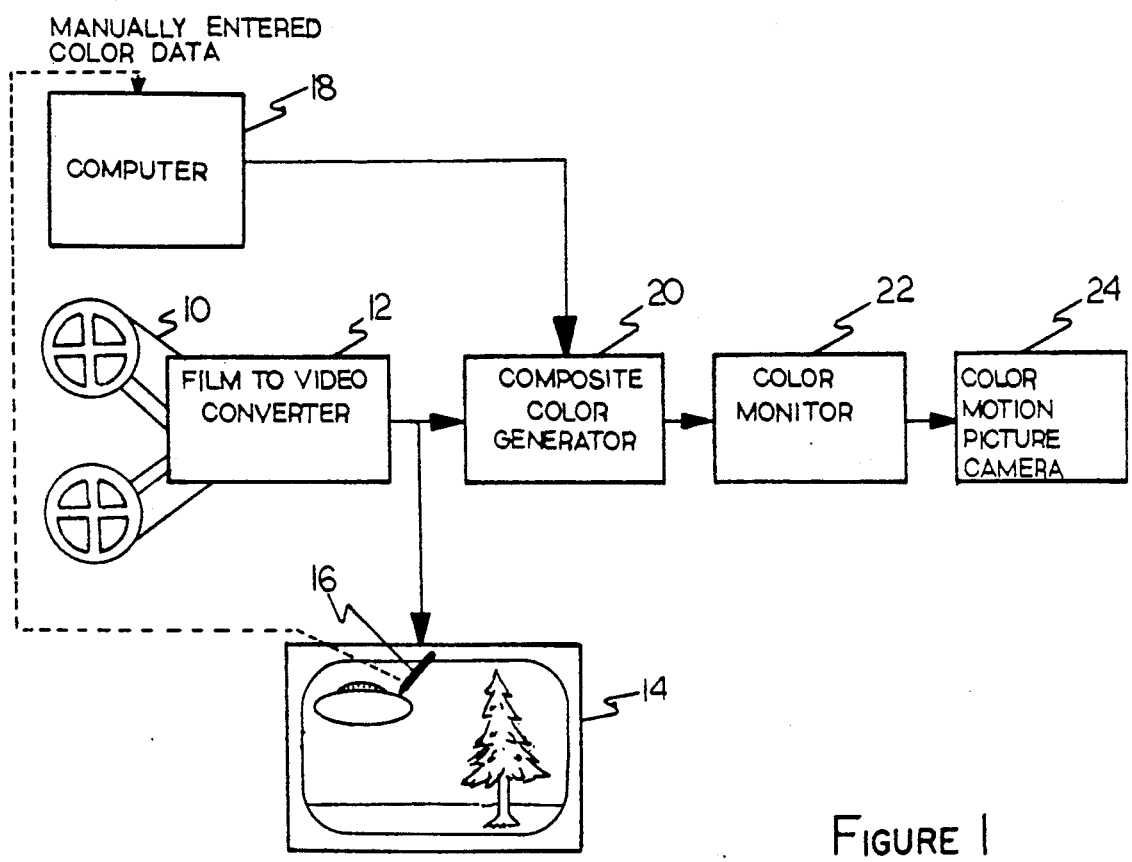
FIG. 1 is a schematic drawing of a system for carrying out the method of the present invention.

An apparatus for practising the inventive method is illustrated in FIG. 1. In accordance with the invention, a frame of a conventional black & white film strip (or black & white video) is processed by a film to video converter 12 into a standard video image which may be displayed on a frame by frame basis on black & white monitor 14. Monitor 14 is equiped with an X-Y position transducer 16 whose output is coupled to a computer 18. The outline of an object of given color, together with an operator instruction regarding the color desired allows computer 18 to generate a color signal timed in synchronism with the video frame. Computer 18, in turn, outputs the color information which is mixed with the black & white video output of film to video converter 12 by a composite color generator 20. The output of color generator 20 is then passed to a color monitor 22. The output of color monitor 22 may be photographed by color motion picture camera 24 to produce a hard copy on photographic film in color of the original frame of black & white film 10.

During practice of the inventive process, the black & white film strip 10 is converted on a frame by frame basis by converter 12 to a video image. The first image of the film strip would be displayed in black & white on monitor 14, as described above, prior to conversion of subsequent images to video signals. The image on the first frame would be held in conventional fashion for continuous display on monitor 14. During the period of continuous display, X-Y position transducer 16 is used to translate the outlines of objects of various colors to generate color control information. For example, position transducer 16 could be made by a manual operator to follow the outside line 26 defining flying saucer 28 in frame 30. At the same time, computer 18 is then instructed that the area within this figure is to be colored red. Outside line 32 defining tree foliage 34 is then followed by the transducer and the computer instructed to generate the color green. In similar fashion trunk 36 may be colored dark brown. The computer is then instructed after the tracing of horizon line 38 to color all remaining material above line 38 blue and all material below line 38 tan. This would result in colorization of the entire picture. The computer could also be instructed respecting which objects are moving, (e.g., flying saucer 28) and which objects are stationary, (e.g., horizon 38). With respect to moving objects, these objects could be surrounded with an aura 40 of their own color which extends beyond their borders in an indistinct and fuzzy fashion. Such extension may also be greater in the direction of movement. In the drawing the bottom of the flying saucer would have such a greater aura. On the other hand, where both objects are stationary, the aura of color may be replaced with a mixing zone 42, such as that existing around horizon 38 during which one color would gradually shift to another, thus avoiding a comic book like appearance. As an alternative to a blurry aura or mixing zone, the color information may simply be blurred by using a low resolution digital or analog encoder for the color information.

Once the color information has been added to the first frame computer 18 can add this information via composite color generator 20 to successive and preceeding black & white frames to generate composite color frames in the same sequence for display on color monitor 22 for photographing by color motion picture camera 24. As an alternative to the monitor 22 and camera 24, a conventional digital film printer may be used.

If we consider the case where flying saucer 28 is moving in the direction indicated by arrow 44, the color information defined by aura 40 and the surface area within aura 40 may be used in successive and proceeding frames.

In particular, for example, if every Nth frame is colored, the information contained within the Nth individual color frame is then used for frame N/2 through N+(N/2)−1, without change. Likewise the color information for the first frame would be used in frames 1 through frame (N/2)−1. This is done by having computer 18 repeating the color information defined by aura 40 (for the nearest individually colored frame) each time on a frame by frame basis, adding it to the particular frame received by generator 20, thus passing a series of full color frames to color monitor 22 for photographing by camera 24. Alternatively, on a frame by frame basis computer generated color information could be superimposed over each black & white frame on a color monitor with any necessary touch-up done manually operating an X-Y position transducer associated with the monitor's screen.

Figure 2:
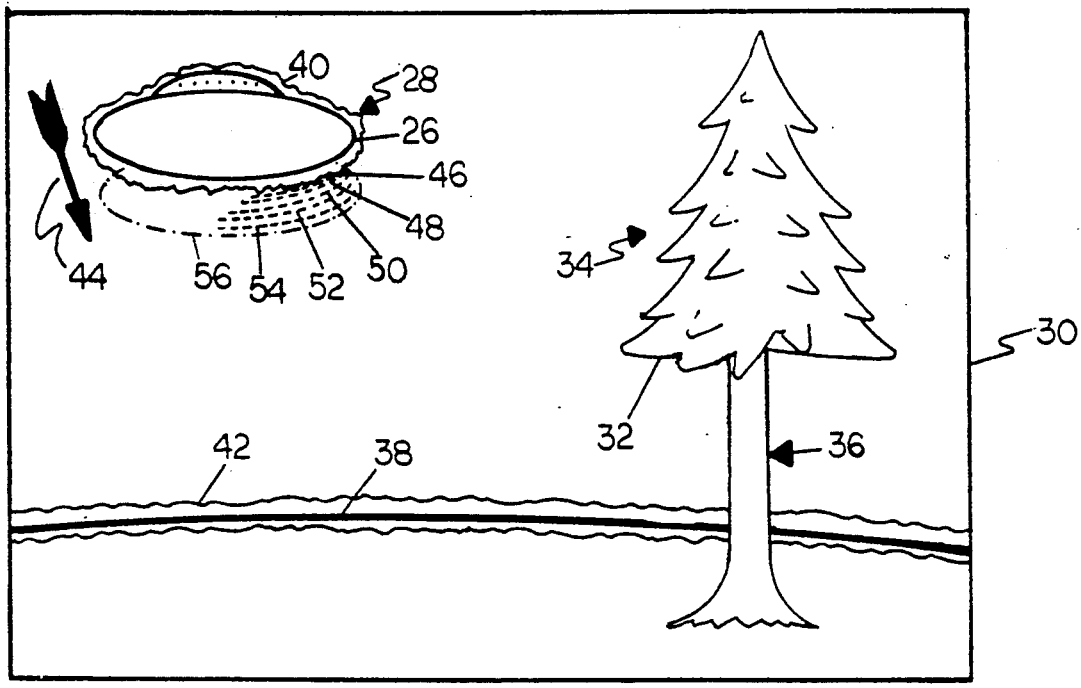
FIG. 2 is a diagram illustrating the method of the invention.

The above is illustrated more clearly with reference to FIG. 2. Halfway to the Nth frame, corresponding to an image of the flying saucer positioned as designated by the numeral 46 in FIG. 2, the color begins to loose its accuracy, due to the displacement between an image positioned between image 26 and image 46. It then becomes necessary to repeat the manual coloring operation on the Nth frame (image 46) that was performed earlier on the first frame 26. The coloring would then be completed for the 2Nth frame 48 through 6Nth frame 56 resulting in the generation of color information approximations for the flying saucer moving from position shown in solid lines (image 26), to the position shown in the dot-dashed lines (image 56) in FIG. 2. Intermediate frames 26 and 46 through 56 would use the color information of their closest manually colored frame, as described above. Naturally, to the extent that other objects remain stationary, color information for frame 26 may be reused by the computer 18 for frames 46 through 56.

In the event that it is desired to further reduce the amount of work involved in manually entering color information, after entering color information for the frame shown in solid lines in FIG. 2 (frame 26), one can immediately go to a much later frame, such as the frame containing image 56 and enter the color information associated with image 56 passing over the operations of adding color individually to images 46 through 54. Using standard interpolation software the computer then interpolates between the color information associated with the solid lines in FIG. 2 (image 26) and the color information associated with image 56 to generate the color information associated with intermediate images 46 through 54. Thus, by generating color information for a limited number of boundary points (i.e., images 26 and 56), the computer generates intermediate information for a number of what might be called sub-boundary points or frames (corresponding to images 46-54). By blurring the color information to extend an aura around the actual color information, we can generate a plurality of color information images which roughly coincide with all frames between individual subpart boundaries defined by images 46-54. If we consider the case where N=10, we could color the first frame individually, go to the 60th frame and color those objects which have moved, allow the computer to generate auras around the colored images associated with the 10th, 20th, 30th, 40th, and 50th frames. These interpolated colorized frames may then be individually corrected by an operator. One then plays back the entire sequence adding the operator furnished color information of the first frame, to frames 1 through 4, the interpolated color information of the 10th frame to frames 5 through 14, the interpolated color information of the 20th frame to the frames 15 to 24, the interpolated color information of the 30th frame to frames 25 through 34, and so forth. Alternatively, cross-disolving may be employed as is discussed below. Thus, if one wished to color 6000 frames in a given motion sequence, it would merely be necessary to manually enter complete color information for one frame and up-date information for 100 additional frames. Such up-date information would be processed in such a manor as to override non-varying color information, such as the coloring of the sky and the ground above and below horizon 42 in FIG. 2.

As the value of N in the above example increases, jumping of a blurred color image will occur in a physiologically perceptable fashion. This movement in color information can be smoothed by cross-disolving intermediate blurred color frames by colorizing them with different percentages of adjacent individually colorized frames. The chart below illustrates such a use of mixed color information. In it, each of the frames (frame number) is colorized with a percentage of the color information form its respective earlier adjacent colorized (E. Adj. Frame) and later adjacent colorized (L. Adj. Frame) frames.

| Frame Number | E. Adj. % | Frame | L. Adj. % | Frame |
| --- | --- | --- | --- | --- |
| 1 | 1 | 100 | 10 | 0 |
| 2 | 1 | 89 | 10 | 11 |
| 3 | 1 | 78 | 10 | 22 |
| 4 | 1 | 67 | 10 | 33 |
| 5 | 1 | 56 | 10 | 44 |
| 6 | 1 | 45 | 10 | 55 |
| 7 | 1 | 34 | 10 | 66 |
| 8 | 1 | 23 | 10 | 77 |
| 9 | 1 | 12 | 10 | 88 |
| 10 | 10 | 100 | 20 | 0 |
| 11 | 10 | 90 | 20 | 10 |
| 12 | 10 | 80 | 20 | 20 |
| 13 | 10 | 70 | 20 | 30 |
| 14 | 10 | 60 | 20 | 40 |
| 15 | 10 | 50 | 20 | 50 |
| 16 | 10 | 40 | 20 | 60 |
| 17 | 10 | 30 | 20 | 70 |
| 18 | 10 | 20 | 20 | 80 |
| 19 | 10 | 10 | 20 | 90 |
| 20 | 20 | 100 | 30 | 0 |

By cross-disolving between the color portion of frames colored by either the computer or by hand, not every frame need have a unique color component; although for each frame the unique black & white information may be used.

Figure 3:
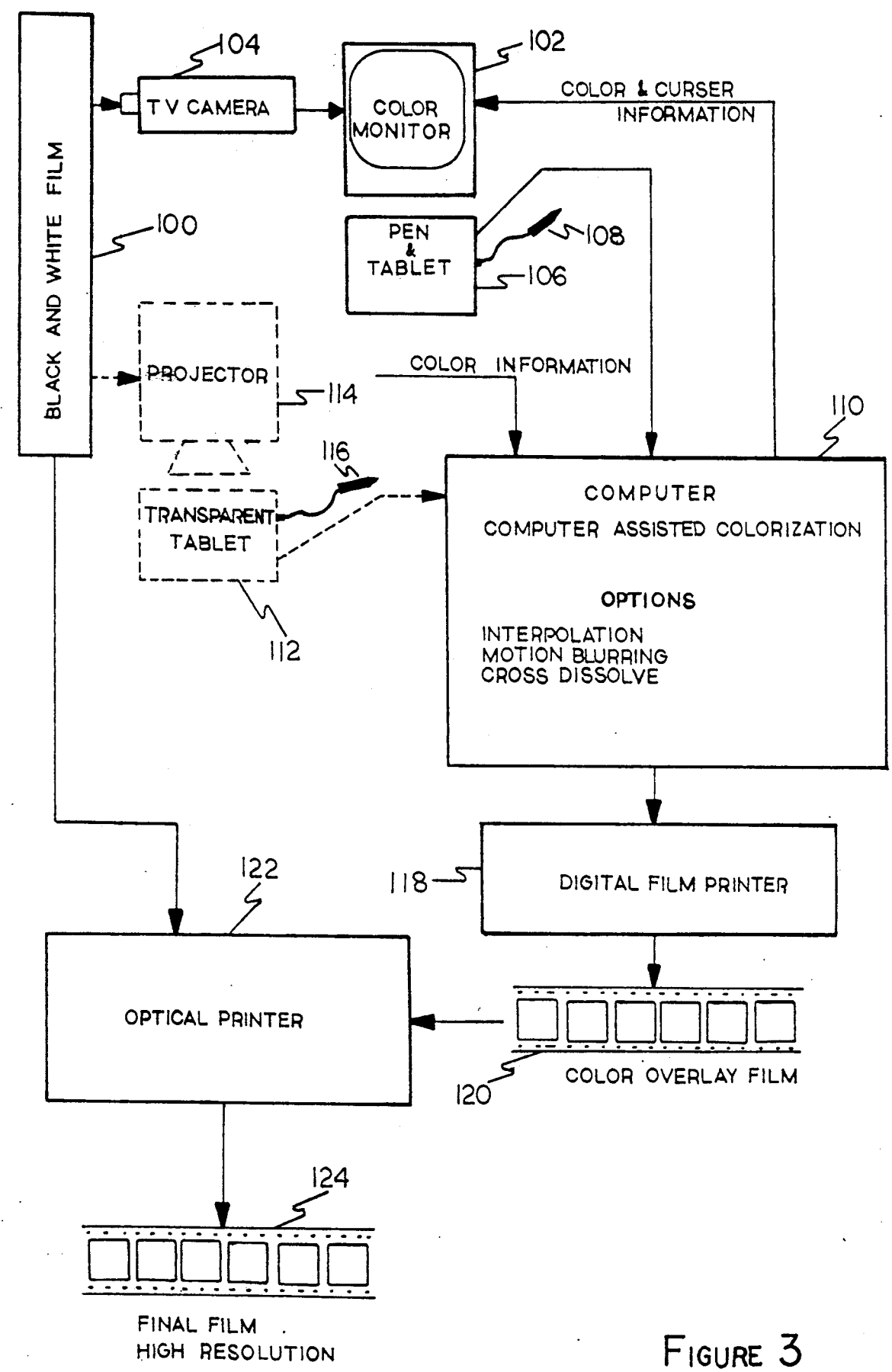
FIGS. 3, 3a, and 4, 4a illustrate alternative systems for carrying out the invention.
Figure 4:
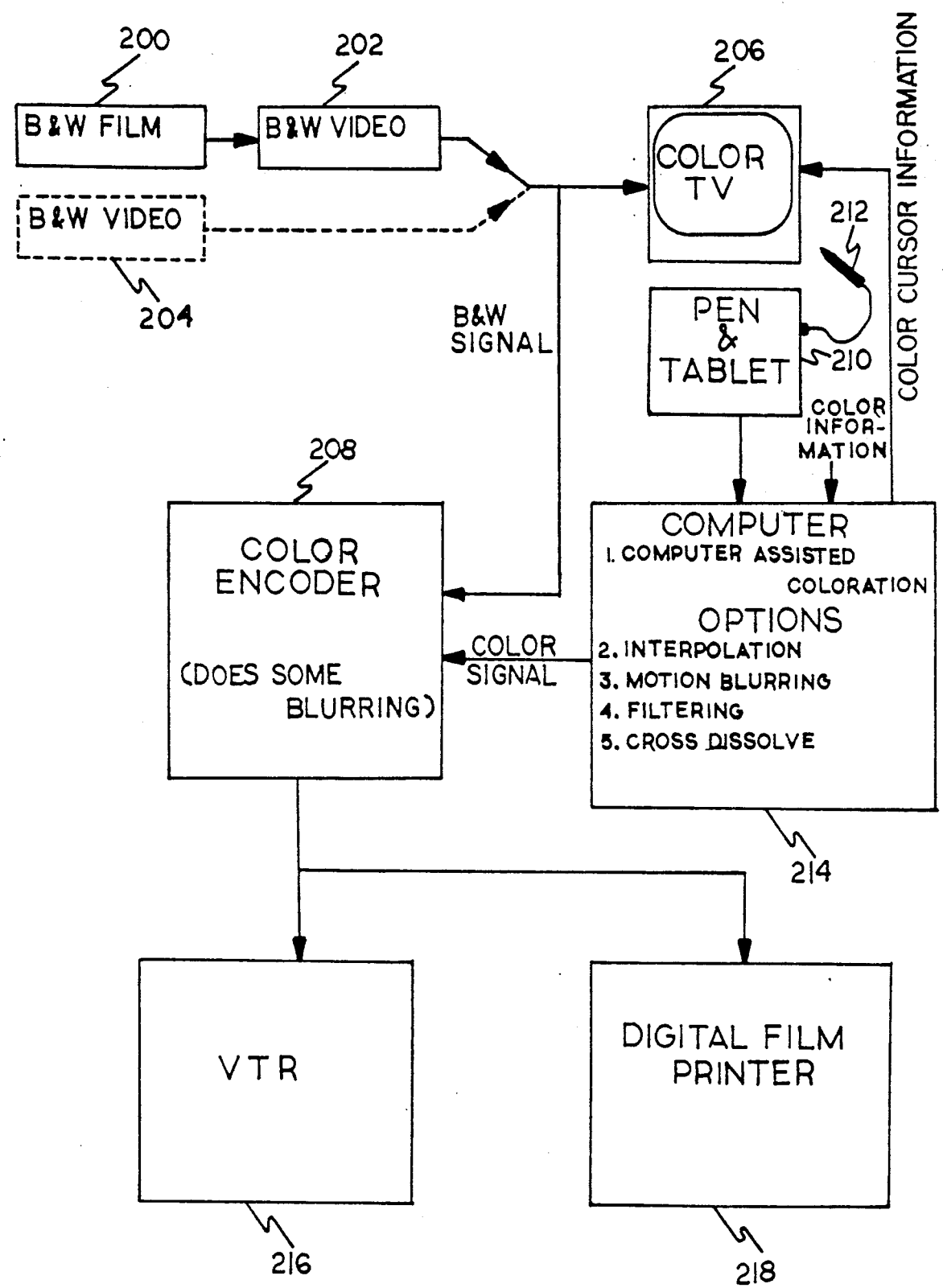

Different ways of implementing the above process are illustrated by the three systems shown in FIGS. 3 and 4.

Considering first FIG. 3, a black & white film original 100 is displayed on a television monitor 102 via a film projector and television camera 104. An X-Y data entry tablet 106 incorporating an electronic stylus 108 is used by a human operator to trace the color outlines of an image to be colorized. This image information is processed into color information through computer 110. The computer, in turn, feeds back color information to the operator which is displayed on monitor 102. Alternatively black & white film original 100 may be projected onto a transparent X-Y data entry tablet 112 by a projector 114 to be traced with a stylus 116. Such a system is illustrated in dashed lines in FIG. 3.

As discussed above, area outlining, color choice and motion specification information is fed to computer 110. The computer coordinates the system components to accomplish the desired computer assisted colorization. In addition, computer 110 will perform the steps of interpolation between hand traced frames, edge traced blurring of objects based upon motion information, blurring of the color image (by filtering or other suitable method), and cross-disolving between color components which generate color images for intervening frames.

The computer then generates a "color-only" information signal which is sent to a digital film printer 118 which generates a color overlay film 120. Color overlay film 120 is combined with original black & white film 100 by an optical printer 122 to generate high resolution colorized film 124.

An alternative system is illustrated in FIG. 4. In accordance with this system, black & white film 200 is converted by a video camera 202 into a video signal. Alternatively, film 200 and camera 202 may be replaced by a black & white video source such as a video tape recorder 204. This black & white video signal is displayed on a monitor 206 and sent to a color encoder 208 to be combined with a color signal to be generated as described below.

An X-Y position transducer 210 incorporating an electronic stylus 212 is used to generate color outline information which together with color choice information and motion specification is input into computer 214. Computer 214 generates a color signal which is combined with a black & white signal by color encoder 208 to generate a composite color image which, in turn, is sent to a video tape recorder 216. Alternatively, the output of the color encoder may be sent to a digital film printer 218 for generation of a hard copy of the colorized motion picture. It is also noted that the output of the computer 214 is used to generate color information on monitor 206, allowing the operator to adjust the manually entered colors in any desired manner.

It should be noted that in the digital domain information requirements to store and process information are reduced in three ways. By using lower resolution for the color information, the number of pixels or dots is reduced (spatial resolution). Further, by generating the color information only, the number of bits required to specify each dot is reduced. This number of bits can be further reduced by limiting the number of hues of color that may be entered into the system. Thirdly, by generating color for only every Nth frame, information requirements are further reduced.

While the instant invention has been described in the context of adding color to a motion picture which was initially filmed in black and white, the inventive system is also useful to replace, modify or enhance the color aspects of an existing color film. This may be desired if the film has deteriorated due to age, exposure to light or other elements or has been damaged by water, fingerprints or other causes. It may also be useful to correct film scenes which have been shot under adverse conditions such as poor lighting or exposure or which have been improperly processed or handled. Color may also be adjusted to correct for inconsistancies between scenes. Finally the color film may be modified for purposes of "special effects" or any other desired technical or aesthetic reasons.

Such color alteration or enhancement can be carried out in three steps. The first is the extraction of the black & white and color portions of the information from the original full color film or video. The second is the modification or regeneration of the color portion (and in some cases the black & white portion as well) by techniques already described or those described below. The third is the recombination of the black & white and color portions into a full color product as already described.

Figure 3A:
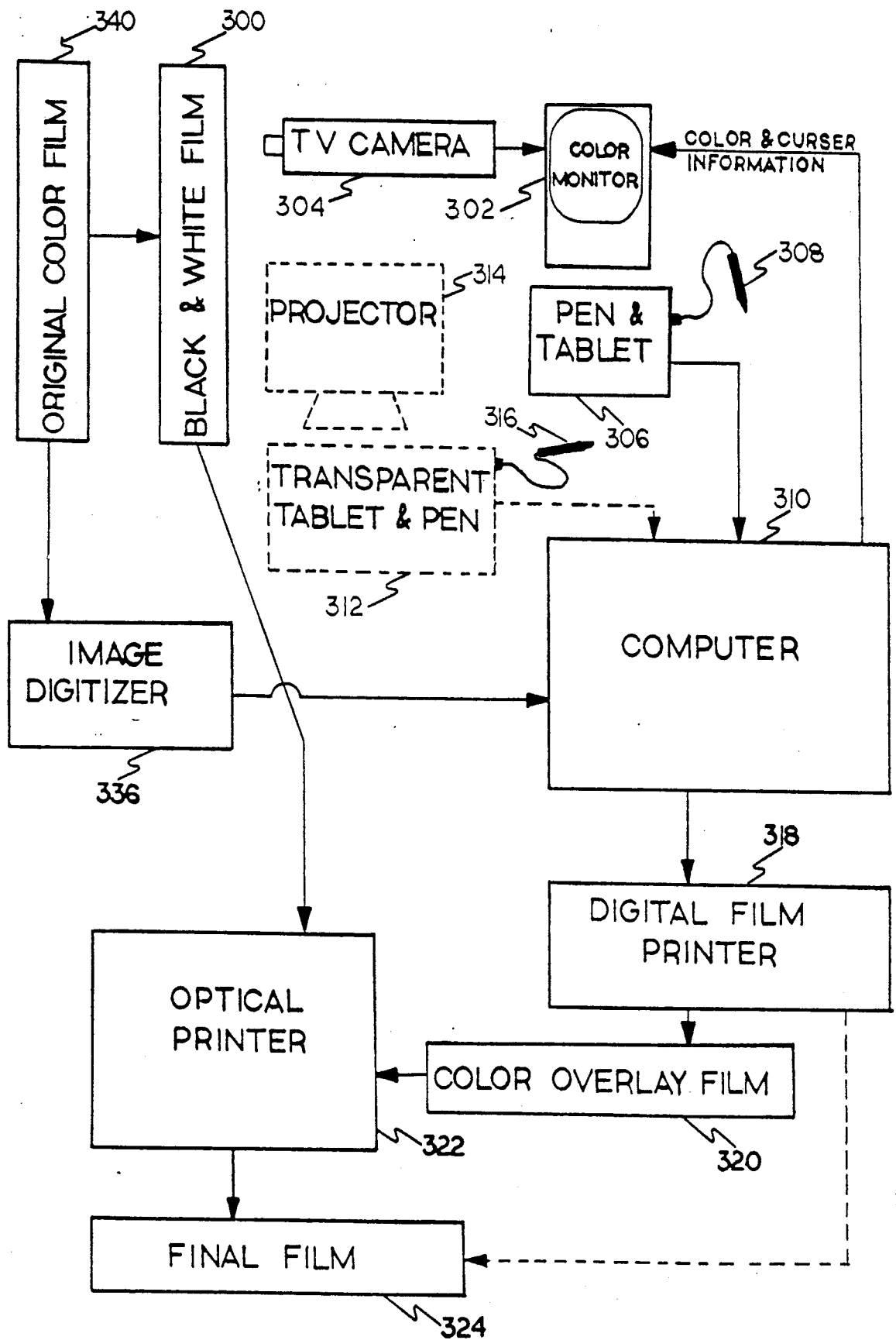

As an example, FIG. 3A shows a system for applying this method to color film 340 where the extraction of the black and white portion is accomplished by printing a high definition black and white film 300 from the original color film 340. The original color film is also scanned by an image digitizer 336 which measures the film at each pixel or dot and converts this to digital numeric information which is fed to computer 310. The computer can then extract the "color-only" information from the digitized full color information.

It should be noted that, since it is the full color information that is input to the computer, the black and white signal could also be extracted by the computer. This would be particularly useful for cases where the black & white portion of the image was also damaged or deficient in some way and would allow for automated repair of both the color and black & white aspects of the image. However it should be understood that, since the eye is less sensitive to color information, the color information can be digitized, stored and/or processed at lower density than the black & white information.

The color information can be handled at lower density using any combination of three methods. The first method is dealing with the color information at lower geometric resolution, i.e. fewer pixels. The second is by limiting the number of possible colors or gradations of colors thus requiring fewer bits to specify the color at each pixel, i.e. lower color choice resolution. The third is by dealing with unique color information for only some frames, i.e. lower temporal resolution. While the above techniques can provide considerable savings of storage and processing resources the invention is not limited to cases where they are applied. It should also be noted that these same techniques can be applied to the black & white portion of the image as well as the color; but, since the eye is more sensitive to black & white information, their use may be more severely limited by anomalies of perception.

In the original film 340, the black & while information is at high density and, if it is to be extracted for processing and regeneration by the computer without losing detail, the original film must be scanned at high density. If the black & white information does not require regeneration it can be preserved at high density on film strip 300. This allows film 340 to be scanned in at lower density since the black & white portion of this information will eventually be discarded. (However, this low density black & white information may be used to determine how to process the color signal. For example, patern recognition and image analysis of shadows, highlights and texture may be used to classify objects in or areas of the overall image. Once classified these distinct areas or objects may have their respective color components processed in different ways. A more straight foward algorithm would be to search for particularly "bright" pixels in the black & white information; these would correspond to "highlighted" areas. If the color aspect of these pixels were made more blue, for example, it would appear that the light source that caused the highlights was more blue.) In this way, color information can be scanned, processed and stored at a lower density without causing degradation of the black & white information. When the high density black and white information is combined with low density color information the result is an apparently high density color image. The same principles apply to the practice of the technique where the original material is on video. If fact, with composite color television systems the practice may be simplified since the color signals are usually generated at lower resolution than the black & white signal.

The second step is to process the seperated color signal. A black & white signal can be similarly processed by the computer if it has been scanned and extracted, but the discussion here will focus on the color signal. Returning to FIG. 3A, once the color information (and optionally the black & white information also) has been input to computer 310 it may be processed in any combination of several ways.

Firstly, image processing algorithms may be applied uniformly over a frame for every pixel. For example, it may be known how particular film dyes deteriorate over time, or measurement of the faded color of known objects in the image could yield this information. Rules for how to restore various colors to their original values would then be developed and applied to the color of each pixel. This technique would also be useful for scenes which were shot, handled or processed adversly or to match the look between scenes. Since the digitized images are in the computer, the rules for color modification may be developed by the computer from programmed analysis of this information. In the case where it is desired to match the look of several scenes, scanned information from one scene may be analyzed to determine the modifications required for another scene.

Secondly, the computer may be programmed to process the image non-uniformly over the frame. Here the rules will not only take into account the value scanned in for a pixel but its position in the frame and other information derived from analyzing the image and from knowledge of how the image was created or damaged. Non-uniform processing rules may also be developed to describe "special effects" or other desired results. For example, a light leak in a camera may have caused one side of the image to be "washed out". An algorithm could be developed indicating that the pixels on the "washed out" side be made more saturated in color with a gradual lessening of the effect toward the other side. As another example, we may wish to create the "special effect" of a light source off to the right side. A first step would be to use an algorithm to detect object edges based on analysis of differences in the color and black & white values of groups of pixels. As a second step the right side of all objects would then be colored more like the color of the light source and the left side less so. If a separate black & white signal were also in the computer the right side of the black & white objects could be lightened and the left side darkened to further enhance the effect.

Non-uniform processing rules may be derived from analysis of information components of images other than the one being modified. For example, the color values of the pixels of the color component of one image may be used to modify the color pixel values of another image to be processed. Assume the first component is from an image of a person's face against a "blue screen" background. A second color component might be modified as follows. Where ever the first color component had pixels of "blue screen" blue the second component would remain unmodified; elsewhere the pixels of the second component would be adjusted towards that of the first component. This technique could be used to produce the effects of adding the reflection of someone's face to a shop window, of a ghost or spirit, or to add flame or explosion to an image.

Thirdly, color modifications may be effected by operator intervention using the methods described earlier for adding color to black & white film. For example, the tablet 306 and pen 308 could be used to outline the face of a character in every frame or only in some frames with the face outline being interpolated between frames. All of the pixels within this outlined area could then be made redder causing the appearance of a "flush", denoting embarasment of the character.

The technique of interpolating processes between frames is not limited to cases of operator input. It may be applied to any stage of an image generation or processing technique where a input is not specified for each and every frame or where unique output is not produced for each and every frame. For example cross-dissolving may be classified as an interpolative technique.

The third step in the process is to recombine the color and black & white signals. This can be done in computer 310 if both are present and then put on film 324 by digital film printer 318. If only the color signal is in the computer it is put on a color overlay film 320 by digital film printer 318 and combined with the high density black & white film 300 in optical printer 322.

Figure 4A:
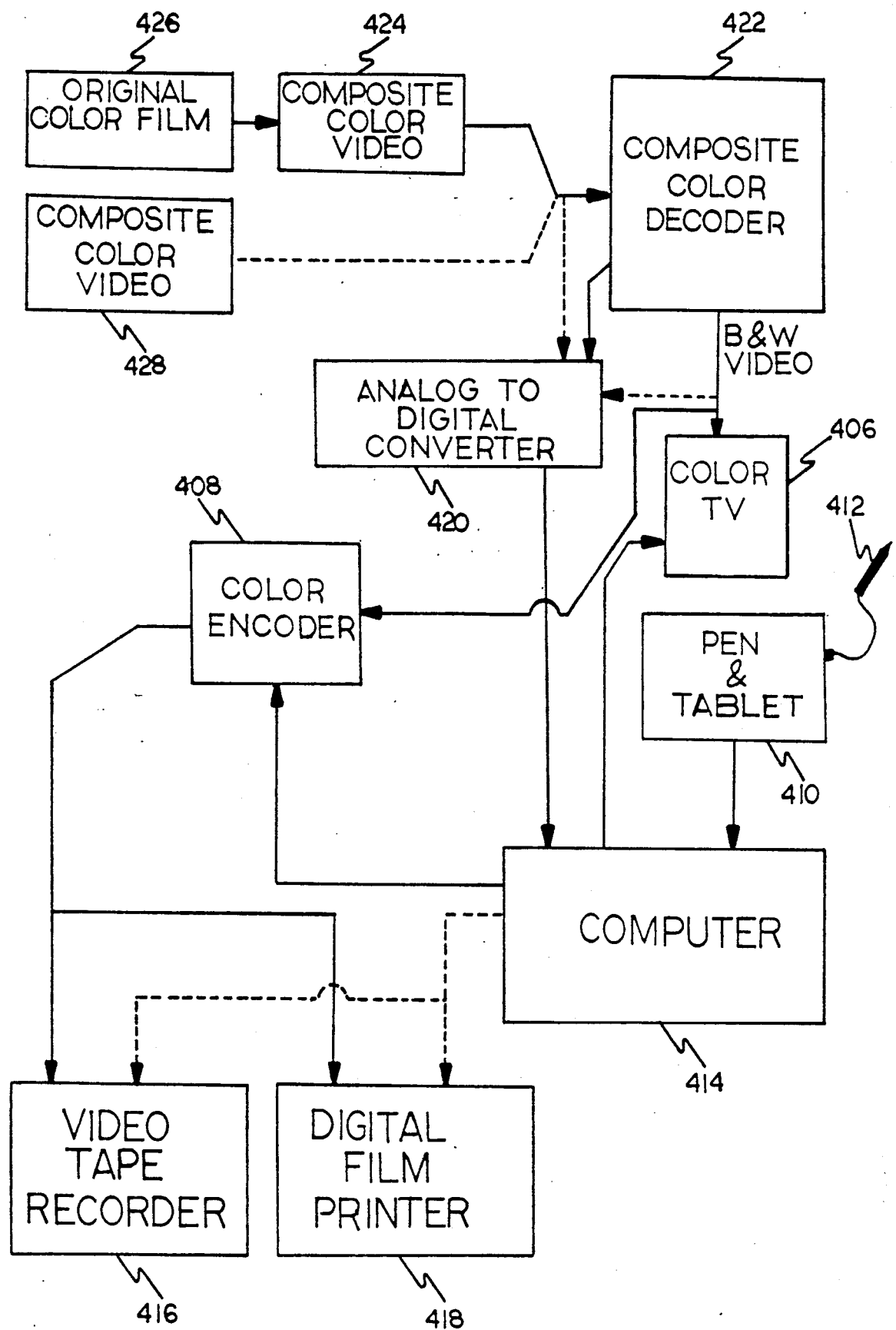

FIG. 4A shows the color modification technique as applied to a full color video original 428 or to a color film 426 to color video 424 transfer of material. Composite color video most often consists of electronically extractable black & white and one or more color signals. A signal decoder 422 can take in composite color and put out a black & white ("luminance" or "Y") signal and color signals ("R-Y" and "G-Y", "I" and "Q" or "Hue" and "Chroma" are some of the forms these signals take). The color signals are generally at lower bandwidth or resolution than the black & white signal. (An alternative system sometimes used from color cameras is for high bandwidth red, green and blue signals [RGB] to be available from which the high resolution black & white "Y" and low resolution color "I" and "Q" signals are developed.) In all cases the color and optionally the black & white signals are digitized by the analog-to-digital converters 420 and fed to computer 414. As an alternative, the entire color signal may be digitized and the extraction of black & white and color signals done computationally by the computer 414.

The second step of processing the signals is largely the same as described above for material originating on film. One point of difference is that since the black & white and color seperation may be done before the signals are input to the computer the black & white component may bypass the computer completely. However it may be of use to digitize and input this signal, even at lower resolution, for use by the computer in determining how to modify the color signal. The black & white information may then be discarded and replaced by the original high resolution black & white video signal.

The third step of combining the black & white information with the modified color information may be done computationally by the computer if both are present. The composite signal is then sent to a digital film printer 418 or recorded on video tape recorder 416. Alternately the new color signal may be combined with the original black & white video signal in a color encoder 408 and then recorded on video tape recorder 416 or film printer 418.

As has been noted throughout the color information may exist at lower density than the black & white information in any combination of several ways, namely geometric, temporal or color choice resolution. When combined with a higher density black & white information component the composite image will be perceived as high density full color information because the eye is less sensitive to the color detail than to black & white detail. However, low density information is sometimes perceived as "jagged", "chunky", "contoured" or to "jump" or "flicker" in some manner. Image processing or signal filtering techniques can be applied to lessen these effects and have been referred to generally as blurring the signal. This filtering or anti-aliasing can take several forms and can happen at several different stages in the system. For the "jaggedness" caused by low geometric resolution, processing of the color signal may be done while it is still in the computer. This may consist of a simple spatial low pass digital filter or more sophisticated computer algorithms. It should also be noted that while the color information may be scanned, stored and processed at low density, after it is optionally filtered by the computer it may be output as a higher resolution (but not really higher information content) signal before being recorded. The color component may also be filtered after it leaves the computer, for example, in the color encoder 208 or 408 in FIGS. 4 and 4A or by defocusing or placing a diffusion filter in the optical train of optical printer 122 or 322 in FIGS. 3 and 3A. Lastly, the inherent properties of film and video media or of the recording systems themselves may cause filtering. The anomalies caused by low color choice resolution can be lessened by similar methods.

For anomalies caused by low temporal density the filtering methods happen over time rather than over space. The "cross-dissolving" between unique frames of color information, that was described earlier, is an example of this. It can be carried out by the computer or done as a post computational process in the film or video domain.

While an illustrative embodiment has been described, it is of course, understood that various modifications will be obvious to those with ordinary skill in the art. For example, the colorization and other processes can be applied to images and image components stored in the video and digital computer domains as well as to those on film. Also, a variety of processes have been described, not all of which need to be applied in all versions of the invention. Such modifications are within the spirit and scope of the invention, which is limited and defined only by the appended claims.

What is claimed is:

1. A method for colorizing a relatively high information density black & white image comprising the steps of:
    [a] generating color information of lower information density than said black & white image for said black & white image; and
    [b] combining said low information density color information with said black & white information to produce a full color image of relatively high information density.

2. A method as in claim 1, wherein steps [a] and [b] are performed on successive frames of a black & white motion sequence.

3. A method as in claim 2, wherein said motion sequence is derived from a motion picture film.

4. A method as in claim 2, wherein said motion sequence is derived from video media.

5. A method as in claim 1, wherein a step is performed between steps [1] and [b of:
    [aa] computer processing said low information density color information to produce processed low information density color information.

6. A method as in claim 5, wherein said processing is carried out with a lower information density than the information density of said black & white image.

7. A method as in claim 5, wherein said processing consists of filtering said color information.

8. A method as in claim 5, wherein said processing consists of creating additional information to be incorporated into said color information.

9. A method as in claim 5, wherein said processing is varied in response to instructions from an operator.

10. A method as in claim 5, wherein said processing is varied in accordance with a computer algorithm.

11. A method as in claim 2, wherein said color information is generated with a lower temporal information density than the temporal information density of said black & white motion sequence.

12. A method as in claim 11, further comprising the step of systhesizing intermediate color information by interpolating between existing color information.

13. A method as in claim 5, wherein the three steps are performed on successive frames of a black & white motion sequence and said processing of the color information is in the temporal domain.

14. A method as in claim 13, wherein said temporal domain processing consists of temporal filtering.

15. A method as in claim 13, wherein said temporal domain processing consists of cross-dissolving.

16. A method as in claim 13, wherein said processing is varied in accordance with specifications pertaining to the motion of individual objects portrayed in said black & white motion sequence.

17. A method as in claim 1, wherein said combination is achieved optically.

18. A method as in claim 1, wherein said combination is achieved electronically.

19. A method for colorizing a series of black & white frames containing relatively high density black & white information in a motion sequence, comprising the steps of:
 [a] generating a relatively low density color information frame for a first black & white frame in said motion sequence;
 [b] generating a second relatively low density color information frame for a second black & white frame which is a first number of frames from said first black & white frame in said motion sequence; and
 [c] combining said relatively low density color information frames with the black & white frames to which they are associated.

20. A method as in claim 19, comprising the additional step of:
 [d] generating at least one intermediate color information frame to be associated with a black & white frame intermediate between said first and second black & white frames by interpolating color information between said first and second generated color information frames.

21. A method as in claim 20, wherein said interpolation is shape interpolation.

22. A method as in claim 20, wherein said interpolation is cross-dissolving.

23. A method as in claim 19, comprising the additional step between steps [b] and [c] of:
 [e] processing said color information frames.

24. A method as in claim 20, comprising the additional step between steps [b] and [c] of:
 [f] generating at least one mixed color information frame between at least one adjacent pair of said color information frames, to be associated with a black & white frame intermediate between the black & white frames associated with said pair of color information frames, by interpolation between said pair of color information frames.

25. A method as in claim 24, wherein said interpolation is shape interpolation.

26. A method as in claim 24, wherein said interpolation is cross-dissolving.

27. A method as in claim 19, comprising the additional step between steps [b] and [c] of:
 [g] associating those black & white frames not already associated with color information frames to a near by color information frame.

28. A method for modifying visual information in an image comprising the steps of:
 [a] separating said visual information into a plurality of individual components;
 [b] processing at least one of said individual components separately to generate at least one processed component at an information density lower than that component posessed in the original image; and
 [c] combining said components into a modified image.

29. A method as in claim 28, wherein the image is a full color image, said full color image is separated into color and black & white components, and said combination results in a full color image.

30. A method as in claim 28, wherein steps [a] through [c] are performed on successive frames of a motion sequence.

31. A method as in claim 30, wherein said motion sequence is derived from a motion picture film.

32. A method as in claim 30, wherein said motion sequence is derived from video media.

33. A method as in claim 28, wherein at least one component is separated with a lower information density than the information density of the same component in said image.

34. A method as in claim 28, wherein at least one component is processed with a lower information than the information density of the same component in said image.

35. A method as in claim 28, wherein one component is processed with a lower information density than that of another component.

36. A method as in claim 28, wherein said processing includes the process of filtering one of said plurality of image components.

37. A method as in claim 28, wherein said processing is varied in response to instructions from an operator.

38. A method as in claim 28, wherein said processing is varied in accordance with a computer algorithm.

39. A method as in claim 30, wherein at least one of said information components is separated with a lower temporal information density than the temporal information density of the same component in said motion sequence.

40. A method as in claim 30, wherein at least one of said information components of said motion sequence is processed in the temporal domain.

41. A method as in claim 40, wherein at least one of said information components is processed with a lower temporal information density than the temporal information density of the same component in said motion sequence.

42. A method as in claim 40, wherein one of said information components is processed at lower temporal density than another component.

43. A method as in claim 39, comprising the further step of systhesizing intermediate component information by interpolating between existing component information.

44. A method as in claim 40, wherein said temporal processing consists of temporal filtering.

45. A method as in claim 43, wherein said temporal processing consists of cross-dissolving.

46. A method as in claim 28, wherein said combination is achieved optically.

47. A method as in claim 28, wherein said combination is achieved electronically.

48. A process for computer colorizing a black & white motion image sequence comprising information of a first information density, comprising the steps of:
[a] specifying to the computer, color-only information of a second information density comprising a plurality of area outlines derived from said black & white image sequence information, said second information density being lower than said first information density;
[b] computer processing said color-only information to create processed color-only information of a third information density, said third information density being higher than said second information density; and
[c] combining said processed color-only information and said black & white information to create full-color motion sequence information of relatively high information density.

49. A method for modifying a full color film, comprising the steps of:
[a] making a black & white film from said full color film;
[b] inputing said full color film into a computer;
[c] separating a relatively low information density color-only component from the full color information in the computer;
[d] processing said color-only component, in the computer, into a processed color-only component;
[e] outputing said processed color-only information component onto film; and
[f] combining said color-only film with said black & white film into a modified full color film.

50. A method for modifying a motion sequence, comprising the steps of:
[a] inputing said motion sequence into a computer;
[b] separating a multiplicity of information components from the motion sequence information in the computer;
[c] processing at least one of said information components, in th computer, at an information density lower than the information density of the original motion sequence, into a processed component;
[d] combining said multiplicity of information components into modified motion sequence information of relatively high information density; and
[e] outputing said modified motion sequence information.

51. A product produced by placing on an information bearing medium an information bearing signal containing at least some information derived from a signal generated by the method of claim 1, 2, 5, 11, 12, 19, 28, 30, 38, 48, 49 or 50.

52. A product produced by placing on a film medium an information bearing signal containing at least some information derived from a signal generated by the method of claim 1, 2, 5, 11, 12, 19, 28, 30, 38, 48, 49 or 50.

53. The process of broadcasting an information bearing signal containing at least some information derived from a signal generated by the method of claim 1, 2, 5, 11, 12, 19, 28, 30, 38, 48, 49 or 50.

* * * * *